Patented Nov. 2, 1948

2,453,040

UNITED STATES PATENT OFFICE 2,453,040

ART OF TREATING LEAFY VEGETABLES

Jagan N. Sharma, Los Angeles, Calif., assignor of 9/100 to William H. Wilson, 9/100 to Annetta E. Wilson, 9/100 to Nancy J. Doyle, 9/100 to William H. Wilson, Jr., 9/100 to Robert M. Wilson, and 5/100 to A. H. Wilson No Drawing. Application April 9, 1945, Serial No. 587,440

11 Claims. (Cl. 99—193)

The present invention is directed to methods, materials and conditions for use in the treatment of leafy vegetables for the purpose of preserving their fresh appearance and condition and is specifically directed to the utilization of novel materials in inhibiting the darkening of the severed butt ends of leafy vegetables. For the purposes of this application, the term "leafy vegetables" is deemed to refer to lettuce, endive, chicory, celery and vegetables of the genus "brassica," such as cabbage, cauliflower, broccoli, etc.

The vegetable-growing industry has been faced for years with the problem of maintaining the fresh appearance of vegetables during the protracted shipping and storage periods. The severed butts of leafy vegetables are particularly susceptible to the formation of brown and reddish discolorations at the cut surfaces and this invention is directed to a simple and effective method whereby the formation of such discoloration during shipment and storage is inhibited.

In order to simlify explanation, particular reference will be directed to the treatment of lettuce, although the method as previously stated is equally useful in the treatment of other vegetables.

Ordinarily, lettuce is brought in from the field, trimmed and placed in crates with butts up. A layer of lettuce is then commonly covered with a sheet of paper and crushed or finely divided ice is placed over the sheet, another layer of lettuce is then placed on the ice with butts up, another sheet of paper applied over the butts, and additional ice placed thereover, these operations being repeated until the crate is full.

The sheets of paper serve to prevent bruises on the tender outer leaves of lettuce from sharp edges of particles of ice. Even under these refrigerated conditions the butt ends become discolored and upon arriving at their destination the butts and outer leaves of the lettuce must again be trimmed off.

Recently the process described in Patent No. 2,215,446 has been employed, this patent disclosing the application of an absorbent sheet of paper impregnated with a solution of sodium thiosulfate or other allied chemical. It has been found that the process retards the discoloration of the butts to some extent but the salts and chemicals used tend to cause plasmolysis, that is, a softening or sliming, and the quantities of chemicals so employed reduce the temperature adjacent the butts to below 31.2° F. which is the freezing temperature of lettuce, so that in a great many instances the lettuce is damped by being frozen during shipment. Freezing of lettuce renders it unsalable.

The term "plasmolysis" as used herein refers to the softening, sliming and degenerated appearance and feel of plant cells, which effects appear to be due to a collapse or rupture of living plant cells by changes in osmotic pressure. In the lettuce trade, lettuce which exhibits plasmolysis after arrival at its destination is identified as being slimy, softened, "overripe" and incapable of "holding up" to atmospheric temperatures on the green grocer's counter. Such sliminess is often evidenced within a few hours, say three to eight hours after the lettuce is unpacked at its destination.

I have discovered that very dilute aqueous solutions of formaldehyde can be successfully employed in inhibiting the darkening of the severed butts of leafy vegetables. In addition, the vegetables do not exhibit plasmolysis after reaching the market or shipping destination. The precise action of formaldehyde on butts of leafy vegetables is not completely understood and its action is totally unlike other so-called antiseptics such as phenol, thymol, hydrogen peroxide, potassium permanganate, etc. The last-named antiseptics, for example, increase the darkening of lettuce butts whereas formaldehyde inhibits such discoloration. Bacterial decomposition does not appear to be the cause of discoloration of lettuce butts and bactericides, fungicides, etc., are not effective, as a class, for the attainment of the objects of this invention.

It is an object of the present invention, therefore, to disclose and provide an improved method of treatment to prevent the discoloration of butt ends of leafy vegetables during shipment and simultaneously to prevent plasmolysis or sliming and softening after the vegetables arrive at their destination.

A further object is to disclose and provide a method of treating leafy vegetables with water-soluble aldehydes (particularly formaldehyde and acetaldehyde) and the conditions under which such treatment successfully prevents discoloration of butts without the disadvantages incident to prior processes.

These and other objects, uses, advantages, modifications and adaptations of the invention will best be understood from the following detailed description of the invention and from the contemplation of specific examples hereinafter set forth.

In accordance with one method of carrying out the present invention, a layer of lettuce heads may be placed in a crate with butt ends up and the butts then contacted with an absorbent material containing a solution of formaldehyde. Paper sheets of various textures and weights may be employed but in actual practice an absorbent sheet of paper of 300 pound weight has been used. Such paper may be immersed in an aqueous solution containing from about 0.04% to about 0.3% or 0.5% formaldehyde for a few minutes until it is soaked with the solution and the saturated paper then placed over a layer of lettuce so as to contact the butts with the paper. A layer of crushed ice is then placed over the sheet to maintain the lettuce in a suitably cool condition during shipment and storage and additional layers of lettuce superimposed thereon and similarly treated until the crate is filled. This method is eminently suited to the shipment of lettuce over prolonged distances as, for example, to the central and eastern sections of the United States from the west coast. In some instances, as where lighter paper is used, the concentration of the formaldehyde solution can be increased to as high as about 1%.

Instead of employing an absorbent paper, the sheet material used in separating the crushed ice from direct contact with the lettuce may be laminated or coated so as to be virtually impervious to the passage of water therethrough. In the event one surface layer is absorptive, such surface layer with its absorbed treating solution is placed in contact with the butts. When waxed paper is used, the aqueous solution of formaldehyde may contain a wetting agent, so that a substantially continuous film of such solution appears on the sheet after the sheet is immersed in and withdrawn from the solution.

In a modified form of treatment, particularly adapted when no intervening sheets of paper are employed, the ice used may contain from 0.04% to about 0.1% of formaldehyde, this ice, containing the formaldehyde, being then placed directly over the lettuce and in contact therewith. Such ice may be made by adding formaldehyde to the water before it is frozen and the ice crushed or shaved, or the very dilute solution of formaldehyde may be frozen under agitated conditions so as to form a mush, which may or may not be then frozen into solid blocks capable of being crushed in the usual manner. In some instances, ordinary crushed ice may be sprinkled with a solution of formaldehyde to impart to the ice the required content of formaldehyde.

In a still further modification, crushed ice containing from about 0.04% to 0.1% of formaldehyde may be placed directly over sheets of absorbent or porous paper which cover the butt ends of the lettuce, this ice slowly melting during transit and thereby supplying the absorbent sheet with an aqueous solution of formaldehyde.

It is to be noted that the formaldehyde solutions employed as above described are maintained in contact with the butts of the lettuce during a prolonged period of time and my investigations lead me to the conclusion that in order to obtain best results, the butts of lettuce should be subjected to the action of the formaldehyde solutions for a period of time in excess of five hours and preferably during the entire shipping period which may amount to four or five days. It is to be noted that the methods described hereinabove do not include the step of dipping the lettuce into a solution containing formaldehyde. I have observed that when lettuce is actually dipped into solutions containing formaldehyde within the ranges hereinabove expressed, there is a tendency in many instances for the lettuce to become discolored, the leaves of the lettuce turning a yellowish brown. Under the conditions defined hereinabove, however, such discoloration does not take place.

Attention is also called to the fact that formaldehyde solutions as dilute as those herein contemplated are relatively stable and do not readily lose their formaldehyde content and therefore do not impart an undesirable odor to the vegetables. Moreover, these solutions are practically neutral, having a pH of about 6.8 to 7.0. This is of importance inasmuch as appreciably alkaline solutions are detrimental to lettuce.

In some instances, lettuce and other leafy vegetables need not be transported long distances and for short shipments the so-called "dry pack method" is employed. Layers of crushed ice are not used between the lettuce in the so-called "dry pack method." I have found that mere swabbing of the butts with an aqueous solution of from about 0.05% to 1.0% formaldehyde content will maintain the butts fresh and white for the relatively short periods of time required.

Although particular attention has been drawn to the use of formaldehyde, other aldehydes and their aqueous solutions could be used effectively such as, for example, acetaldehyde, although this latter aldehyde must be used in somewhat larger quantities than those hereinbefore referred to for formaldehyde.

Where reference has been made to concentrations as, for example, to a solution containing 1% of formaldehyde, reference is made to content of true formaldehyde and not the so-called commercial formaldehyde or formalin which is itself a 40% solution. About 2.5 parts of formalin by weight would be required to supply 1 part of formaldehyde.

This application is a continuation-in-part of application Serial No. 418,840, filed November 12, 1941, which in now abandoned.

All changes, modifications and adaptations coming within the scope of the appended claims are embraced thereby.

I claim:

1. In a method of inhibiting the discoloration of butt ends of lettuce during shipment and the development of detrimental plasmolysis after the lettuce is unpacked at its destination, the step of: subjecting the butts of lettuce to contact with a substantially neutral aqueous solution containing from about 0.04% to 1.0% of formaldehyde, during shipment under refrigerated conditions.

2. In a method of inhibiting the discoloration of butt ends of lettuce during shipment and the development of detrimental plasmolysis after the lettuce is unpacked at its destination, the step of: applying to butts of lettuce in a crate a sheet of material carrying an aqueous solution containing from about 0.04% to 1.0% of formaldehyde, and shipping such lettuce under conditions of refrigeration.

3. In a method of inhibiting the discoloration of butt ends of lettuce during shipment and the development of detrimental plasmolysis after the lettuce is unpacked at its destination, the step of: applying to butts of lettuce in a crate a sheet of absorbent material carrying an aqueous solution containing from about 0.04% to 0.5% of formaldehyde and shipping such lettuce under conditions of refrigeration.

4. In a method of inhibiting the discoloration of butt ends of lettuce during shipment and the development of detrimental plasmolysis after the lettuce is unpacked at its destination, the steps of: moistening a sheet of material with an aqueous solution containing from about 0.04% to 1.0% of formaldehyde, placing said moistened sheet in contact with butts of lettuce in a crate, and shipping such lettuce under refrigerated conditions.

5. In a method of inhibiting the discoloration of butt ends of leafy vegetables during shipment and the development of detrimental plasmolysis after the leafy vegetables are unpacked at their destination, the step of: subjecting the butts of leafy vegetables to contact with a substantially neutral aqueous solution containing from about 0.04% to 1.0% of formaldehyde, during shipment of such leafy vegetables under refrigerated conditions.

6. In a method of inhibiting the discoloration of butt ends of leafy vegetables during shipment and the development of detrimental plasmolysis after the leafy vegetables are unpacked at their destination, the step of: applying to butts of leafy vegetables in a crate a sheet of material carrying an aqueous solution containing from about 0.4% to 1.0% of an aldehyde from the group consisting of formaldehyde and acetaldehyde, and shipping such leafy vegetables under conditions of refrigeration.

7. In a method of inhibiting the discoloration of the butt ends of lettuce during shipment and storage and the development of a slimy condition in the lettuce after storage under refrigerated conditions, the steps of contacting the butt ends of lettuce with an aqueous solution containing from about 0.1% to about 1.0% of formaldehyde, and maintaining such contact for a period of not less than about five hours.

8. In a method of packing leafy vegetables for shipment to inhibit discoloration of butt ends during shipment and the development of detrimental plasmolysis within five hours after such vegetables arrive at their destination and are unpacked, the step of: placing crushed ice containing from between 0.04% and 0.1% of formaldehyde in heat-exchange relation to the butts of the vegetables whereby the melting ice supplies a solution of formaldehyde to said butts during shipment.

9. In a method of packing lettuce for shipment to inhibit discoloration of the lettuce butts during shipment and the development of detrimental plasmolysis within five hours after such lettuce arrives at its destination and is unpacked, the steps of: placing lettuce in a crate with butt ends up and covering such butts with crushed ice containing between about 0.04% and 0.1% of formaldehyde.

10. In a method of packing lettuce for shipment to inhibit discoloration of the lettuce butts during shipment and the development of detrimental plasmolysis within five hours after such lettuce arrives at its destination and is unpacked, the steps of: placing lettuce in a crate with butt ends up, covering such butt ends with an absorbent material, then placing crushed ice containing between about 0.04% and 0.1% of formaldehyde over said sheet, and maintaining such ice in contact with the absorbent material for a period of not less than five hours.

11. In a method of inhibiting the discoloration of butts of leafy vegetables during shipment and the development of detrimental plasmolysis after the vegetables are unpacked at their destination, the steps of: subjecting the butts of leafy vegetables to contact with an aqueous solution containing from about 0.04% to 1.0% of formaldehyde for a period of not less than five hours during shipment under conditions of refrigeration.

JAGAN N. SHARMA.

No references cited.